United States Patent [19]
Scharlach et al.

[11] Patent Number: 5,689,409
[45] Date of Patent: Nov. 18, 1997

[54] SWITCHED-MODE POWER SUPPLY

[75] Inventors: Peter Scharlach; Jean-Paul Louvel, both of Villingen-Schwenningen, Germany

[73] Assignee: Deutsche Thomson-Brandt GmbH, Villingen-Schwenningen, Germany

[21] Appl. No.: 500,389

[22] Filed: Jul. 10, 1995

[30] Foreign Application Priority Data

Jul. 27, 1994 [EP] European Pat. Off. ............... 94111713

[51] Int. Cl.$^6$ ...................... H02H 7/122; H02M 3/335
[52] U.S. Cl. ..................... 363/56; 363/20; 363/21
[58] Field of Search ...................... 363/20, 21, 40, 363/52, 53, 56

[56] References Cited

U.S. PATENT DOCUMENTS

| | | | |
|---|---|---|---|
| 4,688,157 | 8/1987 | Rischmueller | 363/20 |
| 4,839,786 | 6/1989 | Ohosuga | 363/52 |
| 5,278,748 | 1/1994 | Kitajima | 363/56 |
| 5,351,179 | 9/1994 | Tsai et al. | 363/53 |

*Primary Examiner*—Stuart N. Hecker
*Attorney, Agent, or Firm*—Joseph S. Tripoli; Frederick A. Wein

[57] ABSTRACT

The secondary winding is connected, via the series circuit of a capacitor and a second diode, to the charging capacitor which delivers the operating voltage. The centre point of the series circuit is connected to earth via a third diode. This enables energy to be recovered, in that the energy stored in the capacitor is delivered back to the charging capacitor during the inhibiting phase of the switching transistor.

2 Claims, 1 Drawing Sheet

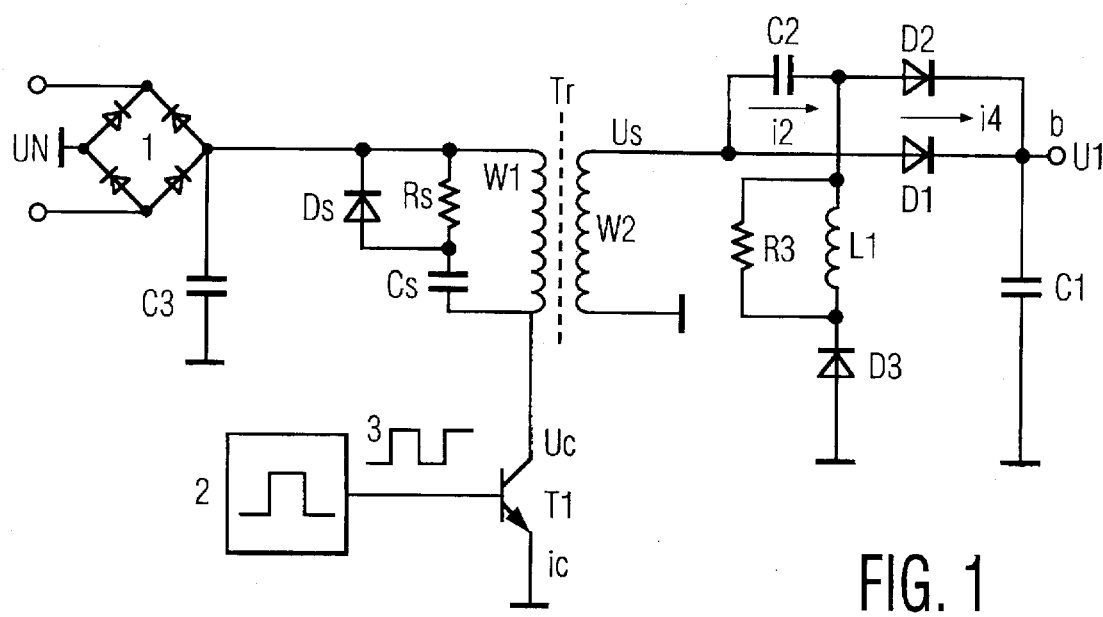
FIG. 1
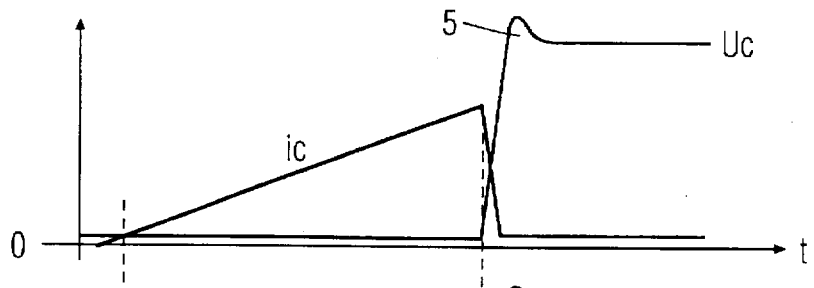
FIG. 2a
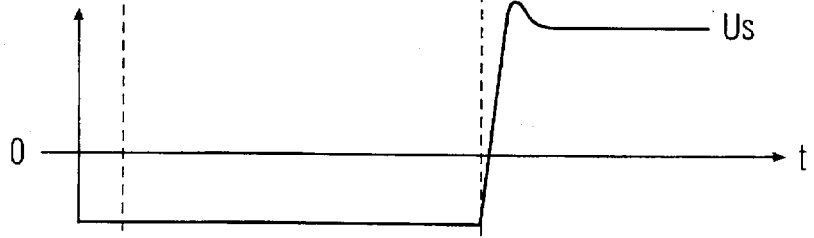
FIG. 2b
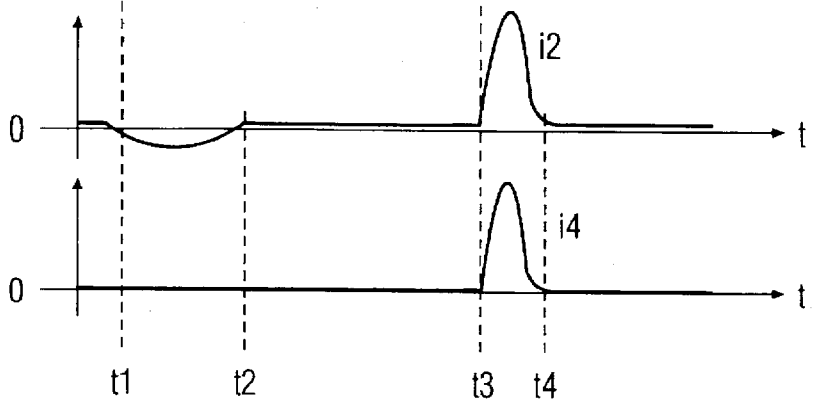
FIG. 2c
FIG. 2d

SWITCHED-MODE POWER SUPPLY

BACKGROUND

The invention is based on a switched-mode power supply.

In the case of a switched-mode power supply of this type, a network comprising a capacitor, a resistor and a diode is generally connected between an end, carrying the pulse voltage, of a winding of the transformer and a point which is dead in terms of AC voltage, for example earth or operating voltage. This network, also referred to as a snubber, is used to reduce the amplitude of interfering voltage spikes across the winding when the switching transistor is turned off. When the switching transistor is turned off, energy is stored in the capacitor of this network. Since this power is delivered by the transformer, the desirable result is a relatively slow rise in the collector voltage. When the switching transistor is turned on again, the energy stored in the capacitor is transmitted to the resistor of the network and converted there into heat. This power loss is considerable and can be of the order of magnitude of 1–5 watts.

The invention is based on the object of modifying a network of this type for reducing the gradient of the voltage rise when the switching transistor is turned of, in such a way that the power generated in the network at the resistor and lost is reduced.

In the case of the invention, the secondary winding is consequently connected to the charging capacitor via the series circuit of a capacitor and a second diode, and the centre point of the series circuit is connected to earth via a third diode.

In the case of the solution according to the invention, the energy stored in the capacitor of the network when the switching transistor is turned off is consequently not converted into heat in a resistor when the switching transistor is turned on, but is advantageously delivered back to the charging capacitor of the rectifier circuit in the sense of energy recovery. Consequently, the network according to the invention essentially contains only components such as diodes and capacitors, which operate virtually without any losses. The resistor which was used hitherto in the said snubber network, for converting the energy into heat, is no longer required. The circuit according to the invention also permits the use of a larger capacitor for the said network and hence an improvement in the reduction of the amplitude of the pulse spikes at the transformer.

Preferably, an inductance is also in series with the third diode. This has the effect that the current through the third diode does not increase abruptly, but increases slowly beginning at zero. A resistor is preferably in parallel with the inductance. This is used for suppressing interfering oscillations.

BRIEF DESCRIPTION OF THE DRAWINGS

The invention is explained below using the drawing, in which

FIG. 1 shows an exemplary embodiment of a switched-mode power supply according to the invention, and FIG. 2 shows curves for explaining the mode of operation of the circuit according to FIG. 1.

DETAILED DESCRIPTION OF THE PREFERRED EMBODIMENT

FIG. 1 shows a switched-mode power supply which generates from a mains voltage UN an operating voltage U1, for example for a television receiver or video recorder. The following are illustrated: the mains rectifier 1, the charging capacitor C3, the transformer Tr having the primary winding W1 and the secondary winding W2, the switching transistor T1, the diode D1 for generating the operating voltage U1 across the charging capacitor C1, as well as a control generator 2 which generates the switching voltage 3 for the switching transistor T1. The switching voltage 3 is usually pulse-width-modulated (PWM). The pulse width modulation is controlled by a control voltage in such a way that the amplitude of the operating voltage U1 generated is stabilized. A customary snubber network having the capacitor Cs, the diode Ds and the resistor Rs is connected to the primary winding W1. The circuit described so far is known.

In addition to the primary snubber network described, it is also known to connect an identically constructed snubber network to a secondary winding as well. A secondary snubber network is also present in FIG. 1, on the winding W2. However, this network has a different design from the snubber network Cs, Rs and Ds on the primary winding W1. The secondary winding W2 is connected to earth via the series circuit of the capacitor C2, the inductance L1 and the diode D3. The centre point a of the series circuit is connected, via the diode D2, to the terminal 6 carrying the operating voltage U1. A resistor R3 is in parallel with the inductance L1.

The secondary network according to FIG. 1 operates as follows: during the conducting phase of the switching transistor T1, the capacitor C2 is charged up to the negative voltage, via the diode D3 and the inductance L1, while the winding W2 is being driven by the transformer. The inductance L1 limits the current rise, starting from 0 A. During this time, energy is therefore stored in the capacitor C2.

When the switching transistor T1 is turned off, the voltage Us across the secondary winding W2 rises rapidly, until finally the voltage across the anode of the diode D2 reaches the value of the voltage of U1 across the charging capacitor C1. At this point in time on, the energy stored in the capacitor C2 is transmitted to the charging capacitor C1 via the diode D2. The reduction, aimed for by the network, in the rise of the voltage Us, that is to say dUs/dt, is achieved by this operation. Since the network contains no resistor comparable with the resistor Rs, in contrast to the primary network, oscillations are produced during this operation. These oscillations are attenuated by the resistor R3.

In FIG. 2, the period t1–t2 designates the forward sweep. During this time, the switching transistor T1 is controlled to conduct by the switching voltage 3. The collector current ic rises approximately linearly, while the collector voltage Uc is virtually zero. The voltage Us across the secondary winding W2 then has its negative value. The so-called flyback begins at the instant t2. The switching transistor T1 is then inhibited, with the result that the collector current ic falls rapidly. This results in a steep rise of the collector voltage Uc with a voltage spike 5, the amplitude of which is limited by the snubber networks described. The voltage Us has a similar characteristic to Uc, but has no DC voltage component. FIG. 2c shows the current i2 through the capacitor C2. The capacitor C2 is charged by this current from t1–t3. The current i2 flows via the diode D2 from t2–t4, with te result that energy stored in the capacitor C2 is transmitted to the charging capacitor C1. FIG. 2d shows the current i4 through the diode D2, which current corresponds to the current i2 during this time.

We claim:

1. Switched-mode power supply having a switching transistor in series with the primary winding of a transformer, the secondary winding of which is connected, via a diode, to a charging capacitor which delivers an operating voltage, a network for reducing voltage spikes being connected to a winding the secondary winding is connected to the charging capacitor via the series circuit of a capacitor and a second diode, and the centre point of the series circuit is connected to earth via a third diode and an inductance in series with said third diode.

2. Power supply according to claim 1 wherein a resistor is in parallel with the inductance.

* * * * *